United States Patent
Deak et al.

(10) Patent No.: US 11,035,716 B2
(45) Date of Patent: Jun. 15, 2021

(54) DIGITAL LIQUID-LEVEL SENSOR HAVING AT LEAST ONE TUNNELING MAGNETORESISTANCE SWITCH

(71) Applicant: MultiDimension Technology Co., Ltd., Zhangjiagang (CN)

(72) Inventors: James Geza Deak, Zhangjiagang (CN); Songsheng Xue, Zhangjiagang (CN)

(73) Assignee: MultiDimension Technology Co., Ltd., Zhangjiagang (CN)

( * ) Notice: Subject to any disclaimer, the term of this patent is extended or adjusted under 35 U.S.C. 154(b) by 578 days.

(21) Appl. No.: 14/763,431

(22) PCT Filed: Jan. 24, 2014

(86) PCT No.: PCT/CN2014/071351
§ 371 (c)(1),
(2) Date: Jul. 24, 2015

(87) PCT Pub. No.: WO2014/114259
PCT Pub. Date: Jul. 31, 2014

(65) Prior Publication Data
US 2015/0355014 A1    Dec. 10, 2015

(30) Foreign Application Priority Data

Jan. 25, 2013 (CN) .......................... 201310029455.1

(51) Int. Cl.
*G01F 23/62*    (2006.01)
*G01F 23/74*    (2006.01)
*G01F 23/72*    (2006.01)

(52) U.S. Cl.
CPC .............. *G01F 23/62* (2013.01); *G01F 23/72* (2013.01); *G01F 23/74* (2013.01)

(58) Field of Classification Search
CPC ........... G01F 23/62; G01F 23/72; G01F 23/74
See application file for complete search history.

(56) References Cited

U.S. PATENT DOCUMENTS 4,361,835 A * 11/1982 Nagy ...................... G01F 23/72
324/207.2
4,409,694 A * 10/1983 Barrett, Sr. ............... E03B 7/04
392/441

(Continued)

FOREIGN PATENT DOCUMENTS

CN    2392172 Y    8/2000
CN    1580717 A    2/2005

(Continued)

OTHER PUBLICATIONS

TMR Omnipolar Switch MMS201H Datasheet (Sep. 14, 2012) (Year: 2012).*

(Continued)

*Primary Examiner* — David M. Gray
*Assistant Examiner* — Quang X Nguyen
(74) *Attorney, Agent, or Firm* — Schwegman Lundberg & Woessner, P.A.

(57) ABSTRACT

A digital liquid-level sensor comprises a non-magnetic conduit, a floater provided outside the non-magnetic conduit and capable of axially moving along the non-magnetic conduit, and a permanent magnet fixed on the floater. The non-magnetic conduit further comprises a switch unit and an encoding unit. The switch unit comprises at least one tunneling magnetoresistance switch which is turned on or turned off under the effect of the magnetic field produced by the permanent magnet; and the encoding unit comprises at least one encoder, of which an input end receives an on/off signal from the tunneling magnetoresistance switch and outputs a digital signal indicating the position of the floater. The digital liquid-level sensor is of a small size; has low cost, low power consumption, high reliability, high sensitivity, high solution, long service life, and a good anti- (Continued)

interference capability; and can directly output the digital signal.

18 Claims, 7 Drawing Sheets

(56) References Cited

U.S. PATENT DOCUMENTS

| | | | | |
|---|---|---|---|---|
| 5,056,049 | A | * | 10/1991 | O'Neill .................. G01B 7/003 340/623 |
| 5,636,548 | A | * | 6/1997 | Dunn ...................... G01F 23/72 73/1.73 |
| 2002/0023490 | A1 | * | 2/2002 | Burns ................... G01F 23/686 73/306 |
| 2002/0077752 | A1 | * | 6/2002 | Burreson ............... G01D 5/251 701/300 |
| 2005/0189938 | A1 | * | 9/2005 | Schley .................. G01D 5/145 324/207.15 |
| 2006/0238281 | A1 | * | 10/2006 | Steinberg .......... H01H 36/0013 335/207 |
| 2011/0074399 | A1 | | 3/2011 | Bartos et al. |

FOREIGN PATENT DOCUMENTS

| | | |
|---|---|---|
| CN | 102419425 | 4/2012 |
| CN | 202372135 | 8/2012 |
| CN | 102768057 A | 11/2012 |
| CN | 202814504 U | 3/2013 |
| CN | 103105216 A | 5/2013 |
| CN | 203053525 U | 7/2013 |
| CN | 203083663 U | 7/2013 |
| CN | 103968918 | 8/2014 |
| DE | 102010025170 | 12/2011 |
| WO | WO-1998017982 | 4/1998 |
| WO | WO-2002006845 | 1/2002 |
| WO | WO-2014/114259 | 7/2014 |

OTHER PUBLICATIONS

"International Application No. PCT/CN2014/071351, International Preliminary Report on Patentability dated Jul. 28, 2015", (w/ English Translation), 19 pgs.

"International Application No. PCT/CN2014/071351, Written Opinion dated May 16, 2014", (w/ English Translation), 17 pgs.

"International Application No. PCT/CN2014/071351, International Search Report dated May 16, 2014", (May 16, 2014), 6 pgs.

"European Application No. 14742929.4, Extended European Search Report dated Oct. 7, 2016", (Oct. 7, 2016), 8 pgs.

"Chinese Application No. 201310029455.1 Second Office Action dated Mar. 23, 2017", (Mar. 23, 2017), 12 pgs.

"Chinese Application No. 201310029455.1, First Office Action dated Jul. 4, 2016", (Jul. 4, 2016), 13 pgs.

"Chinese Application No. 201310029455.1, Third Office Action dated May 11, 2018", (May 11, 2018), 8 pgs.

"Japanese Application No. 2015-554042, Notification of Reasons for Refusal dated Jun. 7, 2017", (Jun. 7, 2017), 4 pgs.

* cited by examiner

DIGITAL LIQUID-LEVEL SENSOR HAVING AT LEAST ONE TUNNELING MAGNETORESISTANCE SWITCH

PRIORITY CLAIM TO RELATED APPLICATIONS

This application is a U.S. national stage application filed under 35 U.S.C. § 371 from International Application Serial No. PCT/CN2014/071351, which was filed 24 Jan. 2014, and published as WO2014/114259 on 31 Jul. 2014, and which claims priority to Chinese Application No. 201310029455.1, filed 25 Jan. 2013, which applications and publication are incorporated by reference as if reproduced herein and made a part hereof in their entirety, and the benefit of priority of each of which is claimed herein.

TECHNICAL FIELD

The present invention relates to a sensor for measuring the level of a liquid, in particular, it relates to a way to use high-precision tunneling magnetoresistance (TMR) switches and encoders to fabricate a liquid-level sensor with digital output.

BACKGROUND ART

Level sensors are widely used in the petroleum, chemical, power, environmental, and other fields, to continuously measure the fluid level or pressure within a vessel, and they also are often applied in a system used to control the level or set an alarm related to the level of a fluid. Presently, these devices commonly use reed switches or Hall sensors. The structure of liquid-level sensors using reed switches is simple, inexpensive, can be applied to controlling or measuring, and the working principle involves a magnetic float that moves up and down with the fluid level, providing a moving magnetic field that changes the state of the reed switches. In this structure, when the magnetic float is at the height of a reed switch, the reed switch will be closed by the magnetic field, forming a closed circuit. When the magnetic float moves away from the reed switch, the switch opens due to the mechanical spring action of the reed, leaving an open circuit. The reed switches are connected to a resistive network, such that the current measured at the level sensor output varies as a function of the float height. The current signal thus determines the liquid level. Often however, a switch may fail, leading to an erroneous reading, and because the switches are relatively large, the resolution of this type of liquid-level sensor is limited. Reed switches may be damaged by impact, abrasion, and vibration, which can crack the glass envelope, which makes the sensors difficult to install and solder. Additionally, when there are inductive or capacitive loads attached to the level sensor, the service life of the level sensor will be affected. Moreover, reed switch based level sensors have an analog output, and they are thus not immune to external electromagnetic interference, so often they need some sort of digital processing circuit to accurately convert the analog signal into a digital signal.

The working principle of Hall-sensor-based liquid-level sensors is similar, except that Hall switches are used instead of reed switches, which are smaller, easier to install and solder, and because they have digital output through an internal A/D convertor, they have better immunity to electromagnetic interference. Unfortunately, Hall switches have high current consumption, on the order of milliamps, so battery powered liquid-level sensors require frequent maintenance and replacement, increasing operational cost.

SUMMARY OF THE INVENTION

The object of the present invention is to overcome the above described problems of the prior art, and to provide a novel, advanced, and reliable digital liquid-level sensor. The present invention utilizes a tunneling magnetoresistance switch to respond to the magnetic field of the float, producing a high or low output, which is sent to an encoder, which produces a code that is output on a digital bus, wherein the code is indicative of the liquid level.

To achieve the above stated technical objectives, the present invention is realized by the following technical scheme:

A digital liquid-level sensor, said sensor measures the level of a fluid and outputs a digital value representing the level. The digital level sensor is comprised of the following components:

A data bus;

A power supply terminal;

A ground terminal;

A nonmagnetic tube fixed and placed in a liquid;

A float that floats in the liquid, and this float is placed adjacent to the nonmagnetic tube, such that the float moves up and down along the axial direction of the nonmagnetic tube when the level of the liquid changes;

A permanent magnet fixed to the float body;

At least one tunneling magnetoresistance switch, wherein the tunneling magnetoresistance switch either opens or closes in response to the magnetic field generated by the permanent magnet, and the permanent magnet generates a magnetic field of sufficient magnitude and orientation such that it opens or closes one or more tunneling magnetoresistance switches at the level of the magnet;

An encoding unit comprised of at least one encoder, said encoding unit generates a unique code for each position of the float;

One or more printed circuit boards sealed inside the nonmagnetic tube, thereon the tunneling magnetoresistance switches, the encoders, the data bus, the power supply terminal, and the ground terminal are mounted.

Preferably, the axial length of the nonmagnetic tube is 10 to 12000 mm, with an outer diameter of 12 to 40 mm.

Preferably, the width of the float is 10 to 200 mm, and it has a height of 10 to 200 mm.

Preferably, the magnetization direction of the permanent magnet is parallel to the magnetization direction of the nonmagnetic tube, and the tunneling magnetoresistance switch is omnipolar or unipolar, and the sensitive direction of the switch is parallel to the axis of the nonmagnetic tube.

Preferably, the magnetization direction of the permanent magnets is perpendicular to the nonmagnetic tube axis, and the tunneling magnetoresistance switch is an omnipolar, bipolar, or unipolar, and the sensing direction of the tunneling magnetoresistance switch is perpendicular to the axial direction of nonmagnetic tube.

Preferably, the float is disposed coaxially with the nonmagnetic tube, and the inner diameter of the float is greater than the outer diameter of the nonmagnetic tube.

Preferably, the tunneling magnetoresistance switches are disposed at equal intervals on the printed circuit board.

Preferably, the encoders are priority encoders.

Preferably, the encoding unit has $2^N$ input terminals and N output terminals, where N is an integer.

Preferably, the position of the float is represented by digits 0,1, ..., $2^N-1$, where N is an integer, such that the numbers have a linear relationship with the height of the fluid surface.

Preferably, the encoder is composed of a custom ASIC, or programmable device such as a FPGA or CPLD, in order to minimize the number of parts of the printed circuit board.

Preferably, for the $2^N$ tunneling magnetoresistance switches, the data bus contains at least N bits, where N is an integer.

Preferably, the tunneling magnetoresistance switches are connected to the corresponding input terminals of the encoder.

Preferably, the output of the encoder connects to the corresponding lines in the data bus.

Preferably, the printed circuit board is a flexible printed circuit board.

Preferably, the encoders and the tunneling magnetoresistance switches are placed on multiple small rigid printed circuit board mutually interconnected using a flexible printed circuit board. Throughout this patent small rigid printed circuit boards are mentioned, the size may be as large or small as necessary, in order to accommodate the tunneling magnetoresistance switches, encoders, data bus, power supply terminal, and the ground terminal.

A digital level sensor, comprising:

A nonmagnetic tube, and

A float that moves along the outside of the nonmagnetic tube in the axial direction, A permanent magnet fixed to the float body, Said nonmagnetic tube further including:

At least one magnetoresistive switch wherein the switch enters the closed or the open state under the action of the magnetic field produced by the permanent magnet, An encoding unit, wherein the encoding unit is comprised of at least one encoder, and the encoding unit receives digital input signals from the magnetoresistive switches, and it outputs a digital code representing the float position, Preferably, the level sensor comprises $2^N$ tunneling magnetoresistance switches, said tunneling magnetoresistance switches disposed in known positions along the axis of the nonmagnetic tube.

Compared with the prior art, the present invention utilizes tunneling magnetoresistance switches to detect the position of the float and uses priority encoders to receive the signal from the tunneling magnetoresistance switches in order to compute a code representing the position of the float. The present invention has the following beneficial effects: small size, low cost, low power consumption, high reliability, high sensitivity, high resolution, long life, electromagnetic noise immunity, and a digital output signal.

The above description is only an overview of the technical solution of the present invention, in order to more clearly understand how the present invention can be implemented in accordance with the content of the description, several preferred embodiments of the present invention along with figures illustrating those embodiments are described in detail below.

BRIEF DESCRIPTION OF THE FIGURES

Here we describe the appended drawings which further describe the present invention, and although they form part of the patent application, and they are used to describe the present invention, they are not intended to limit the present invention. The figures are as follows.

DESCRIPTION OF THE PREFERRED EMBODIMENTS

The text below in accordance with the appended drawings describes several preferred implementations of the present invention.

Example 1

Figure 1:
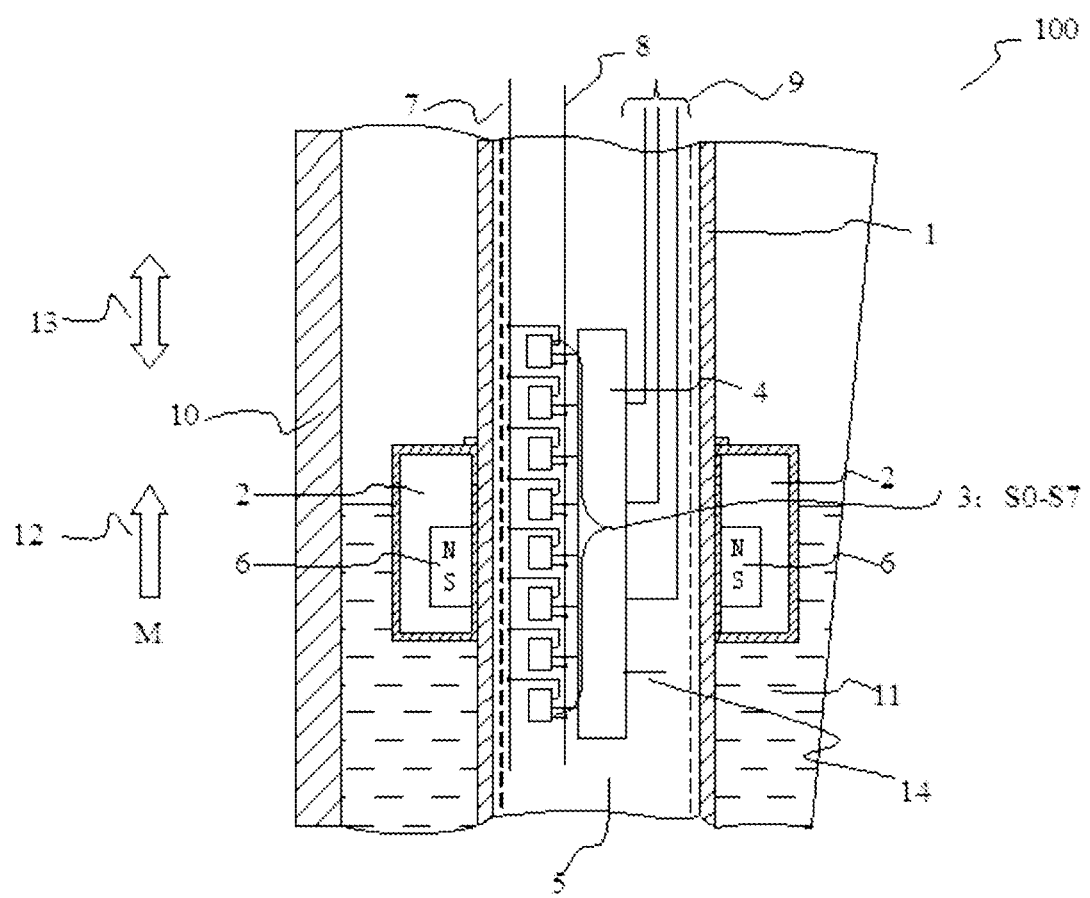
FIG. 1 is a schematic diagram of a liquid-level sensor structure according to the present invention.
Figure 2:
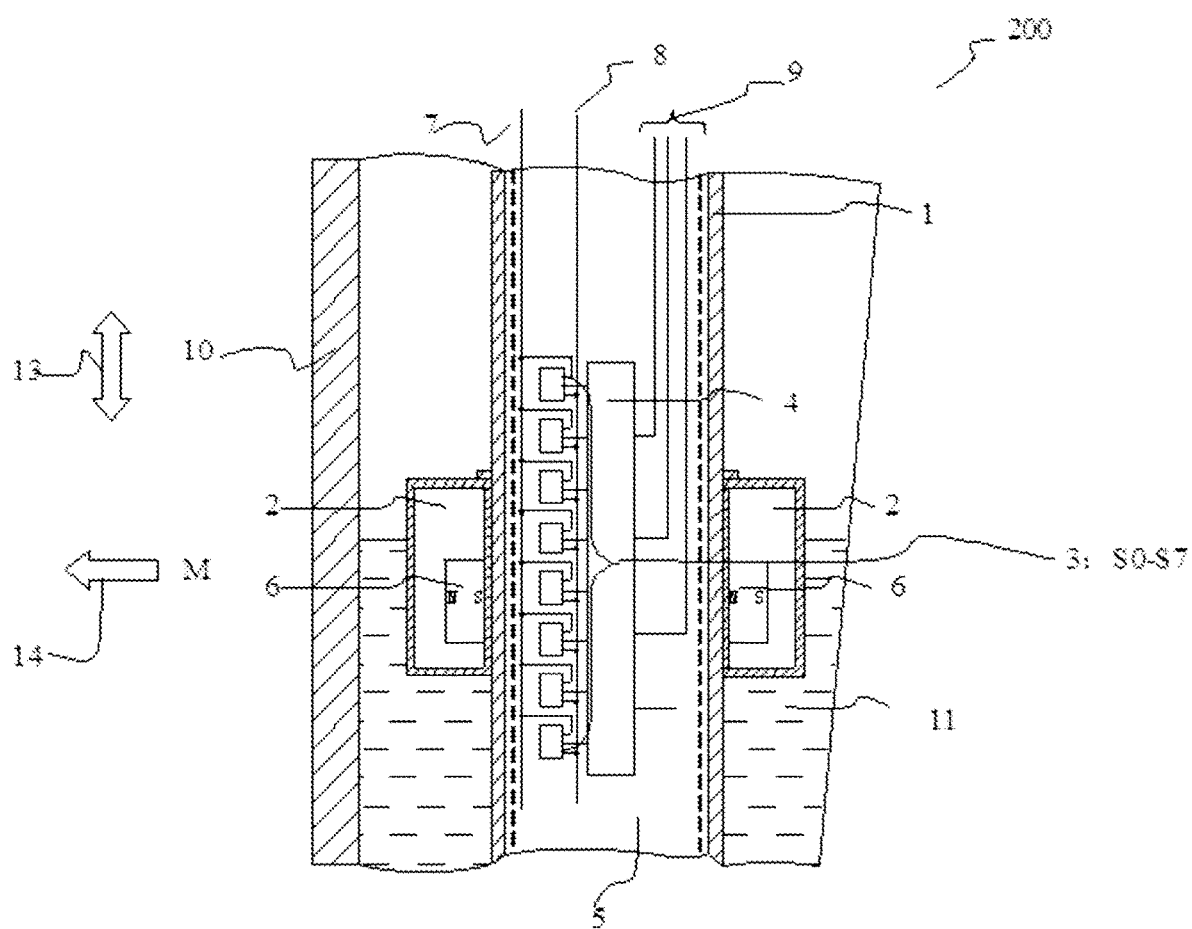
FIG. 2 is a schematic diagram of the liquid-level sensor the present invention as described in example 1.

FIGS. 1 and 2 show the structure of the liquid-level sensor 100,200 according to the first example embodiment of the present invention, the figure schematically shows tunneling magnetoresistance switches 3 and the encoder unit 4 used to generate the digital signal output of the liquid-level sensor. The nonmagnetic tube 1 of the liquid-level sensor is located in and fixed with respect to the bottom of a container, it includes a float 2 that floats on the surface of the liquid 11, adjacent to and moving up and down along the outside of the nonmagnetic tube 1. Preferably the nonmagnetic tube 1 is round, and the float 2 shares the same central axis as the nonmagnetic tube 1. A printed circuit board 5 is located inside the nonmagnetic tube 1, and the printed circuit board is preferably a flexible printed circuit board. Tunneling magnetoresistance switches 3, an encoder 4, a data bus 9, a power line 8, and a ground line 7 are mounted on the printed circuit board 5. The tunneling magnetoresistance switches, encoder, and power wiring may also be installed on a series of small rigid printed circuit boards, which may be interconnected using a flexible printed circuit board or wiring. The tunneling magnetoresistance switching unit 3 comprises a plurality of tunneling magnetoresistance switches, each switch having a specific position in the nonmagnetic tube. A permanent magnet 6 is fixed inside the float 2, and the permanent magnet 6 can produce a magnetic field of sufficient magnitude and direction on a single tunneling magnetoresistance switch 3 that is at the same level in order to initiate the desired switching effect, the magnetization direction 12 inside the permanent magnet 6 is parallel to the axis 13 of the nonmagnetic tube as shown in FIG. 1, or perpendicular to the axis as shown in FIG. 2. Each tunneling magnetoresistance switch 2 output is connected to the corresponding input of the encoder unit 4, and the encoder unit 4 outputs are connected to the data bus 9, the last output of the encoder 14, can be connected to the data bus or used to cascade multiple encoders. When the level sensor is placed in liquid 11, the float 2 floats at the surface of the liquid 11, such that it moves up and down along the length of the nonmagnetic tube 1 as the liquid level changes, and then the permanent magnets 6 located within the float 2 produce a magnetic field at that position within the nonmagnetic tube 1. The tunneling magnetoresistance sensor 3 at the position of the permanent magnet's 6 magnetic field then either closed or opened, resulting in a change to a low or a high digital state, and this output is received by the encoder unit 4. The encoder unit has $2^N$ inputs and N outputs, where N is an integer. Each input of the encoder unit 4 is connected to an output of a tunneling magnetoresistance switch 3 and the outputs are connected to the data bus, as a result the device outputs a digital signal representing the level of the fluid. For the $2^N$ tunneling magnetoresistance switches, the data bus width of at least N bits.

Depending on the environment and conditions of use of the level sensor, preferably a nonmagnetic tube has the following characteristics, e.g., 12~40 mm outer diameter, axial length of 10~12000 mm, and may be straight, may also be elbow, it is made of corrosion-resistant material, which may be a metal alloy or durable plastic.

Preferably, the float 2 and a nonmagnetic tube are coaxially disposed, and the inner diameter of the float 2 is greater than the outer diameter of the nonmagnetic tube 1. The width of the float 2 is preferably 10~200 mm, and the height is preferably from 10~200 mm. A permanent magnet 6 is fixed to the float 2, such that the permanent magnet moves up and down along the axial direction of the nonmagnetic tube. The permanent magnet 6 may be fixed inside the float 2 or outside the float 2.

There are several tunneling magnetoresistance switches denoted S0, S1, ..., S7, with the following characteristics: small size, nominally the packaged part will be approximately 2 mm×3 mm×1 mm; low power consumption, less than 10 microamps, and with a switching point of about ten gauss. Thus the level sensor of the present invention may have a small size, a wide range; long life; high sensitivity. Moreover, the positions of the tunneling magnetoresistance switches may be set to any desired position and spacing within the nonmagnetic tube 1, permitting the level sensor to have high resolution.

The number of tunneling magnetoresistance switches in the level sensor may be defined as:

$$Ns = 2^N - m \qquad (1)$$

Where m represents the number of unused encoder inputs, m may have a value of 0, 1, 2, ..., $2^N - 2^{N-1}$, where N is an integer, specific values can be set based on user requirements. Each tunneling magnetoresistance switches S0, S1, ..., S7 in the axial direction of the nonmagnetic tube 1 is placed at a known axial position along the nonmagnetic tube 1. Preferably, each of the tunneling magnetoresistance switches is spaced in equal increments along the axis of the nonmagnetic tube 1 of length L, where this increment is determined by the distance from the top and bottom ends of the nonmagnetic tube 1 where these positions are denoted as D1 and D2 that the end switches are located, and a length L' of the Ns tunneling magnetoresistance switches. For example, considering a sensor of length 1000 mm, with 100 sensors spread evenly over the distance that is defined by the range between 50 mm from the top and bottom of the sensor, the tunneling magnetoresistance switches will have a spacing DS defined as follows:

$$DS = (L - D1 - D2 - Ns*L')/Ns = (1000 - 50 - 50 - 100*2)/100 = 7 \text{ mm} \qquad (2)$$

It can be seen that the level sensor with a resolution of 7 mm.

Those skilled in the art can appreciate that as long as the tunneling magnetoresistance switches are spaced at known axial positions within the nonmagnetic tube 1, then the position of the float 2 which carries permanent magnet 6 along the outside of the nonmagnetic tube 1 causing a change in the on/off states of the tunneling magnetoresistance switches 3 may be readily determined, thereby yielding a digital level sensor for measuring the level of the fluid in which it is immersed.

Example 2

Figure 3:
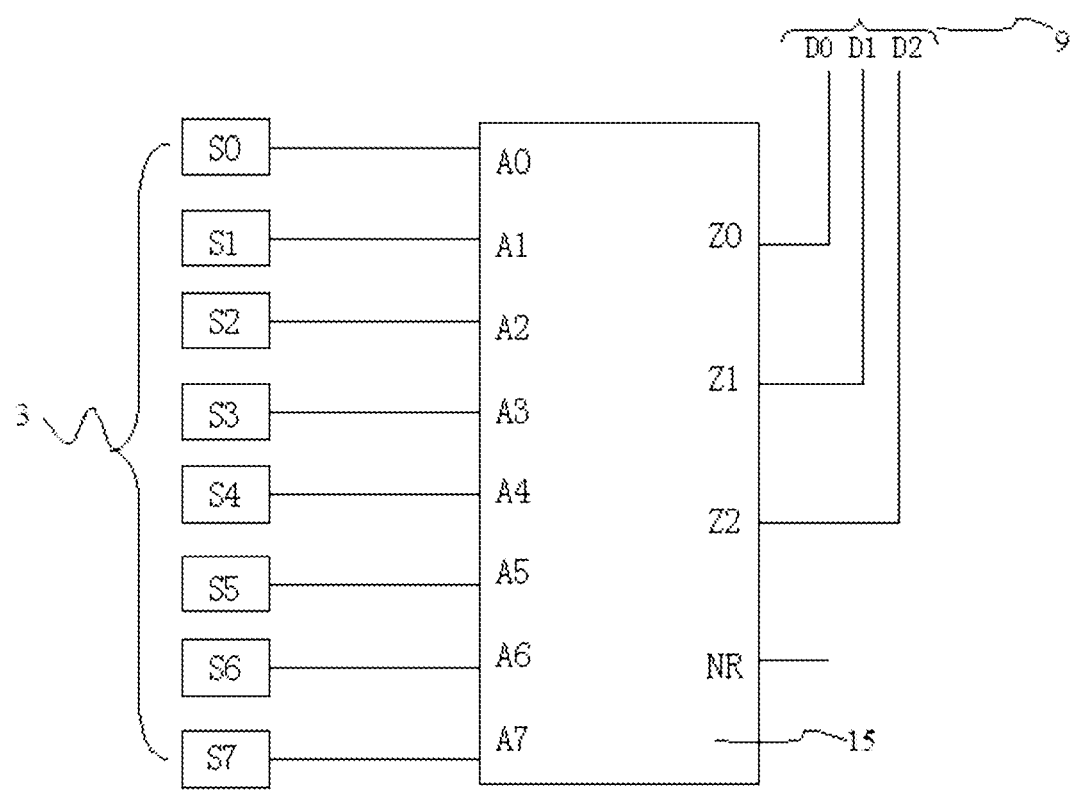
FIG. 3 is a schematic diagram showing the interconnection between the tunneling magnetoresistance switches, the encoder unit, and the data bus of example 2 of the present invention.
Figure 4:
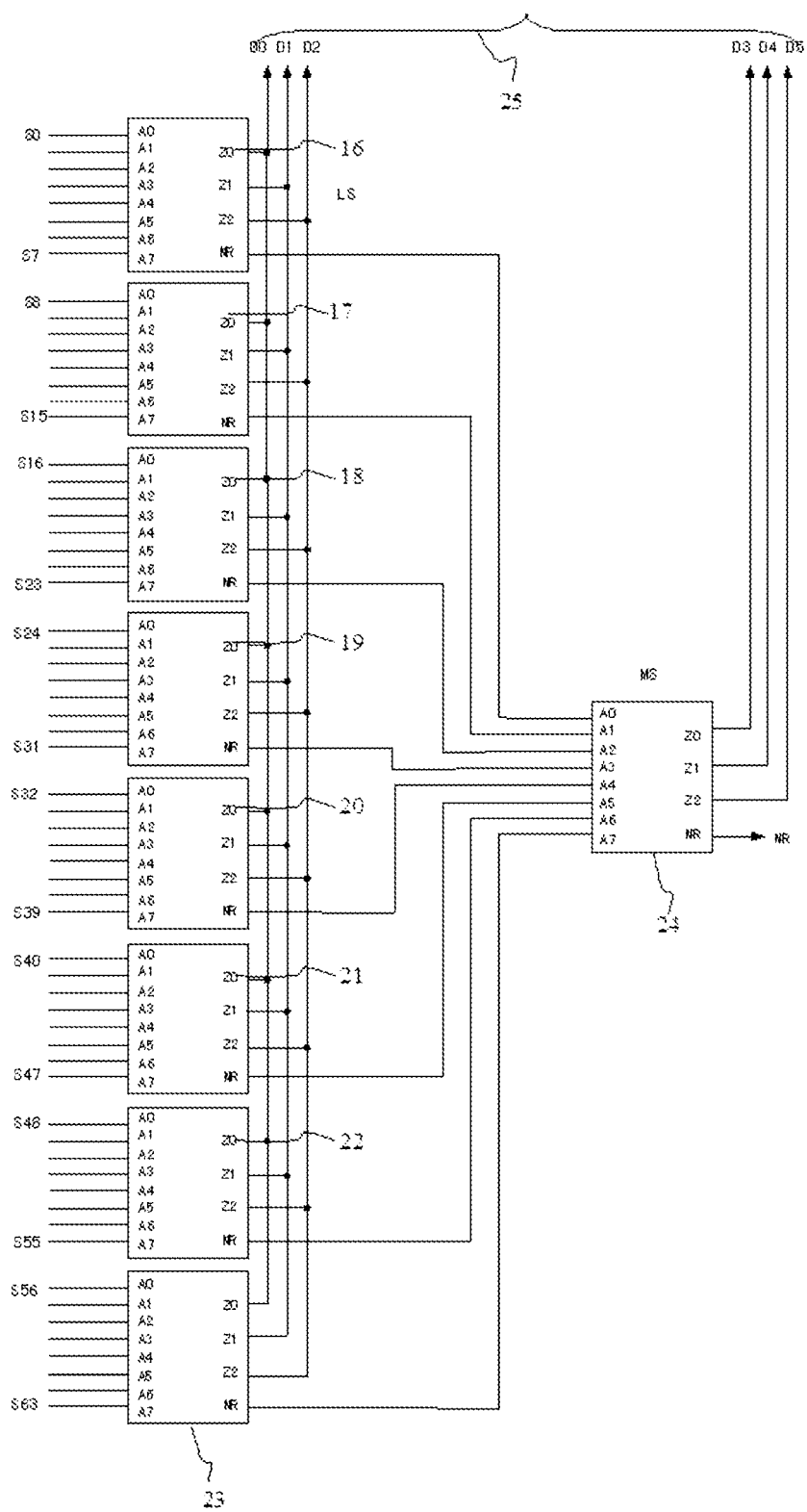
FIG. 4 is a schematic diagram showing the interconnection between the tunneling magnetoresistance switches, the encoder unit, and the data bus of example 3 of the present invention.

FIG. 3 is a schematic diagram showing the interconnection of the tunneling magnetoresistance switches and the priority encoder used in Example 1. According to the present invention, an encoder-off signal from the tunneling magnetoresistance switches produces a unique code each position of permanent magnets attached to the float. In this embodiment, the encoder 15 is an 8 to 3 priority encoder. Priority encoders allow multiple simultaneous input signals, and the output is set based on priority of the input signals, the lowest priority signals do not affect the output, such that only the highest priority input signal controls the output state. With this type of encoder, even if there are several tunneling magnetoresistance switches that are activated by the magnetic field produced by the permanent magnet, the priority encoder ignores all but the highest priority input signal when determining the output, so that it can accurately and unambiguously output the code for the fluid level, and it thus avoids coding errors due to multiple triggered switches. For example, as shown in FIG. 3, when the number of tunnel magneto-resistive switching unit 3 switches, Ns, is eight or less, then only one 8 to 3 priority encoder 15 is needed. FIG. 3 shows the connection diagram for a switching unit comprising eight tunneling magnetoresistance switches S0-S7 and a single 8 to 3 priority encoder 15. In this figure, eight tunneling magnetoresistance switches S0-S7 are electrically interconnected with an 8 to 3 priority encoder 15, such that when one or more of the tunneling magnetoresistance switches S0-S7 is activated by the moving magnetic field, the 8 to 3 priority encoder 15 outputs a code representing the fluid level to data bus 9. For the 8 ($2^3=8$) tunneling magnetoresistance switches S0-S7, the width of the data bus 9 is at least three, which is sufficient to represent 8 different codes. An example of these digital codes is shown in Table 1. Table 1, shows a linear mapping between the float position and thus the liquid surface height with the digitally coded numbers 0,1, ..., $2^N-1$, where N is an integer.

Table 1 shows the relationship between the float position, the digital code, and the output fluid level.

TABLE 1

| Fluid Level in the Tank (%) | Float Position | Digital Signal Output | | |
|---|---|---|---|---|
| | | NR | D2 | D1 | D0 |
| 0 | empty | 0 | 0 | 0 | 0 |
| 12.5 | 0 | 1 | 0 | 0 | 0 |
| 25 | 1 | 1 | 0 | 0 | 1 |
| 37.5 | 2 | 1 | 0 | 1 | 0 |
| 50 | 3 | 1 | 0 | 1 | 1 |
| 62.5 | 4 | 1 | 1 | 0 | 0 |
| 75 | 5 | 1 | 1 | 0 | 1 |
| 87.5 | 6 | 1 | 1 | 1 | 0 |
| 100 | 7 | 1 | 1 | 1 | 1 |

The first column of Table 1 shows the fill level of the tank as a percentage, the second column indicates the positions of the float, which are numbered from 0 to 7, where 0 represents the lowest level position, and 7 being the highest level position. Thus, a larger number indicates a higher float position. The third column enumerates the eight possible combinations of the binary code on signal lines D2/D1/D0 and the NR output value. The three columns representing the digital can be mapped into the second column which represents the float position, and further mapped into the first column which represents the fluid level. For example, when the 8 to 3 priority encoder 15 output is 110, this means that the fluid level is 87.5%.

Example 3

When the liquid level in a vessel is very deep, and high resolution is required, then the number of tunneling magnetoresistance switches must be increased. For example, when it is necessary to use more than 8, but not more than 64 tunneling magnetoresistance switches, a single 8 to 3 priority encoder 15 cannot meet the requirements. It may be possible to use a 16 to 4 priority encoder, a 32 to 5 priority encoder, or a 64 to 6 priority encoder. In the present invention, this can be achieved by cascading a plurality of 8 to 3 priority encoders 16-24 to achieve the same function. In this FIG. 64 tunneling magnetoresistance switches are used in the tunneling magnetoresistance switching unit 3. The tunneling magnetoresistance switches, S0-S63, are respectively connected to respective inputs 8 of the 8 to 3 priority encoders, 16, 17, . . . , 22, 23, the first eight 8 to 3 priority encoders, 16-23, three output terminals respectively are connected to the corresponding lines of the data bus interface 25, which represent outputs D0 to D2. The eight output NR lines of the first eight 8 to 3 priority encoders are connected to the corresponding inputs of priority 8 to 3 priority encoder 24, and 8 to 3 priority encoder's three outputs are connected to the corresponding lines in data bus 25 represented by D3 to D5. For the 64 ($2^6$=64) a tunneling magnetoresistance switches S0-S63, the data bus 25 must have a width of at least six lines. Sixty-four permutations of the 6 data lines representing the binary codes and corresponding float position output are shown in Table 2. In Table 2, the first column is the fluid fill level expressed as a percentage, the second column is the position of the float numbered from 0 to 63, where 0 represents the lowest level position and 63 denotes the highest position. Here, a larger number represents a higher position of the float in the container. The third column is the digital signal output, where NR represents the numerical output terminal meaning the tank is completely full, and D0~D5 represent a binary signal output. The six binary signals output can thus represent the location of the float, and they can thus determine the liquid level in the vessel.

Table 2 explicitly defines the relationship between the float position, the digital signals, and the fluid level.

TABLE 2

| Fluid Level (%) | Float Position | NR | MS D5 | D4 | D3 | LS D2 | D1 | D0 |
|---|---|---|---|---|---|---|---|---|
| 0 | empty | 0 | 0 | 0 | 0 | 0 | 0 | 0 |
| 1.56 | 0 | 1 | 0 | 0 | 0 | 0 | 0 | 0 |
| 3.12 | 1 | 1 | 0 | 0 | 0 | 0 | 0 | 1 |
| 4.68 | 2 | 1 | 0 | 0 | 0 | 0 | 1 | 0 |
| 6.25 | 3 | 1 | 0 | 0 | 0 | 0 | 1 | 1 |
| 7.81 | 4 | 1 | 0 | 0 | 0 | 1 | 0 | 0 |
| 9.38 | 5 | 1 | 0 | 0 | 0 | 1 | 0 | 1 |
| 10.94 | 6 | 1 | 0 | 0 | 0 | 1 | 1 | 0 |
| 12.5 | 7 | 1 | 0 | 0 | 0 | 1 | 1 | 1 |
| 14.06 | 8 | 1 | 0 | 0 | 1 | 0 | 0 | 0 |

TABLE 2-continued

| Fluid Level (%) | Float Position | NR | MS D5 | D4 | D3 | LS D2 | D1 | D0 |
|---|---|---|---|---|---|---|---|---|
| 15.63 | 9 | 1 | 0 | 0 | 1 | 0 | 0 | 1 |
| 17.19 | 10 | 1 | 0 | 0 | 1 | 0 | 1 | 0 |
| 18.75 | 11 | 1 | 0 | 0 | 1 | 0 | 1 | 1 |
| 20.31 | 12 | 1 | 0 | 0 | 1 | 1 | 0 | 0 |
| 21.88 | 13 | 1 | 0 | 0 | 1 | 1 | 0 | 1 |
| 23.44 | 14 | 1 | 0 | 0 | 1 | 1 | 1 | 0 |
| 25 | 15 | 1 | 0 | 0 | 1 | 1 | 1 | 1 |
| 26.56 | 16 | 1 | 0 | 1 | 0 | 0 | 0 | 0 |
| 28.13 | 17 | 1 | 0 | 1 | 0 | 0 | 0 | 1 |
| 29.69 | 18 | 1 | 0 | 1 | 0 | 0 | 1 | 0 |
| 31.25 | 19 | 1 | 0 | 1 | 0 | 0 | 1 | 1 |
| 32.81 | 20 | 1 | 0 | 1 | 0 | 1 | 0 | 0 |
| 34.38 | 21 | 1 | 0 | 1 | 0 | 1 | 0 | 1 |
| 35.94 | 22 | 1 | 0 | 1 | 0 | 1 | 1 | 0 |
| 37.5 | 23 | 1 | 0 | 1 | 0 | 1 | 1 | 1 |
| 39.06 | 24 | 1 | 0 | 1 | 1 | 0 | 0 | 0 |
| 40.63 | 25 | 1 | 0 | 1 | 1 | 0 | 0 | 1 |
| 42.19 | 26 | 1 | 0 | 1 | 1 | 0 | 1 | 0 |
| 43.75 | 27 | 1 | 0 | 1 | 1 | 0 | 1 | 1 |
| 45.31 | 28 | 1 | 0 | 1 | 1 | 1 | 0 | 0 |
| 46.87 | 29 | 1 | 0 | 1 | 1 | 1 | 0 | 1 |
| 48.44 | 30 | 1 | 0 | 1 | 1 | 1 | 1 | 0 |
| 50 | 31 | 1 | 0 | 1 | 1 | 1 | 1 | 1 |
| 51.56 | 32 | 1 | 1 | 0 | 0 | 0 | 0 | 0 |
| 53.13 | 33 | 1 | 1 | 0 | 0 | 0 | 0 | 1 |
| 54.68 | 34 | 1 | 1 | 0 | 0 | 0 | 1 | 0 |
| 56.25 | 35 | 1 | 1 | 0 | 0 | 0 | 1 | 1 |
| 57.81 | 36 | 1 | 1 | 0 | 0 | 1 | 0 | 0 |
| 59.38 | 37 | 1 | 1 | 0 | 0 | 1 | 0 | 1 |
| 60.94 | 38 | 1 | 1 | 0 | 0 | 1 | 1 | 0 |
| 62.5 | 39 | 1 | 1 | 0 | 0 | 1 | 1 | 1 |
| 64.06 | 40 | 1 | 1 | 0 | 1 | 0 | 0 | 0 |
| 65.63 | 41 | 1 | 1 | 0 | 1 | 0 | 0 | 1 |
| 67.19 | 42 | 1 | 1 | 0 | 1 | 0 | 1 | 0 |
| 68.75 | 43 | 1 | 1 | 0 | 1 | 0 | 1 | 1 |
| 70.31 | 44 | 1 | 1 | 0 | 1 | 1 | 0 | 0 |
| 71.88 | 45 | 1 | 1 | 0 | 1 | 1 | 0 | 1 |
| 73.44 | 46 | 1 | 1 | 0 | 1 | 1 | 1 | 0 |
| 75 | 47 | 1 | 1 | 0 | 1 | 1 | 1 | 1 |
| 76.56 | 48 | 1 | 1 | 1 | 0 | 0 | 0 | 0 |
| 78.13 | 49 | 1 | 1 | 1 | 0 | 0 | 0 | 1 |
| 79.69 | 50 | 1 | 1 | 1 | 0 | 0 | 1 | 0 |
| 81.25 | 51 | 1 | 1 | 1 | 0 | 0 | 1 | 1 |
| 82.81 | 52 | 1 | 1 | 1 | 0 | 1 | 0 | 0 |
| 84.38 | 53 | 1 | 1 | 1 | 0 | 1 | 0 | 1 |
| 85.94 | 54 | 1 | 1 | 1 | 0 | 1 | 1 | 0 |
| 87.5 | 55 | 1 | 1 | 1 | 0 | 1 | 1 | 1 |
| 89.06 | 56 | 1 | 1 | 1 | 1 | 0 | 0 | 0 |
| 90.63 | 57 | 1 | 1 | 1 | 1 | 0 | 0 | 1 |
| 92.19 | 58 | 1 | 1 | 1 | 1 | 0 | 1 | 0 |
| 93.75 | 59 | 1 | 1 | 1 | 1 | 0 | 1 | 1 |
| 95.31 | 60 | 1 | 1 | 1 | 1 | 1 | 0 | 0 |
| 96.88 | 61 | 1 | 1 | 1 | 1 | 1 | 0 | 1 |
| 98.44 | 62 | 1 | 1 | 1 | 1 | 1 | 1 | 0 |
| 100 | 63 | 1 | 1 | 1 | 1 | 1 | 1 | 1 |

Those skilled in the art can appreciate that the tunneling magnetoresistance switching unit 3 can be extended to the case of more than 64 tunneling magnetoresistance switches, by selecting and cascading more encoders and adding more output signals to the data bus. Of course, the encoder unit 4 may be a dedicated ASIC, or a programmable logic device such as an FPGA or CPLD in order to achieve cost savings while expanding the width of the encoder.

In examples 2 and 3, the binary signal output from the device can easily be used to determine the location of the float, and thus the liquid level.

Example 4

Tunneling magnetoresistance switches S0, S1, . . . , each contain a half-bridge high-precision push-pull TMR magnetic sensor chip, and CMOS integrated circuits which include a TMR voltage generator, a comparator, Schmitt trigger, and CMOS output circuit, that changes its digital output voltage based on the changing magnetic field. This device includes temperature compensation using an internal voltage regulator, and it allows a wide operating voltage range.

Figure 5:
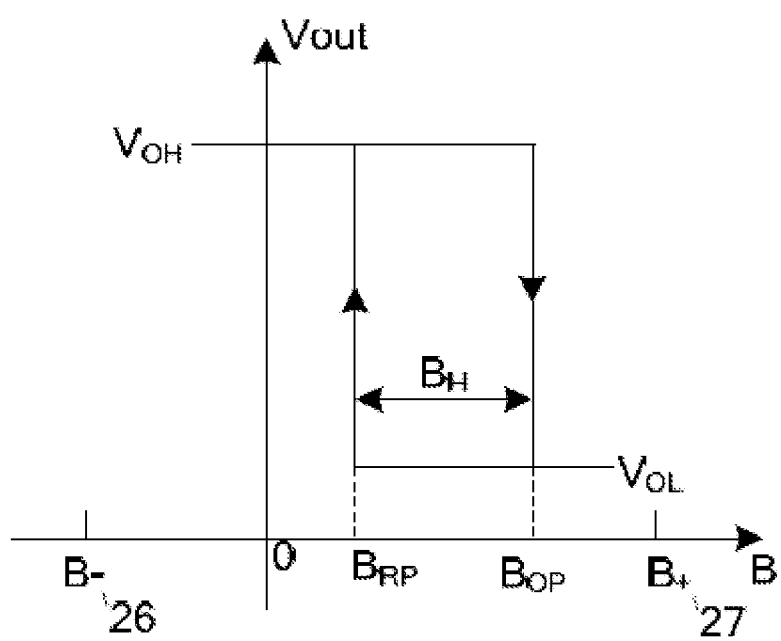
FIG. 5 illustrates the unipolar switching operation of a tunneling magnetoresistance switch.

In one embodiment of the present invention, the tunneling magnetoresistance switching unit 3 utilizes unipolar tunneling magnetoresistance switches. The direction of the permanent magnet's magnetization is parallel to the sensitive direction of the unipolar magnetoresistive switching unit 3, both of which may be parallel or perpendicular to the axis of the nonmagnetic tube. The output signal of a unipolar magnetoresistive switch is illustrated schematically in FIG. 5. In this figure, the magnetic field provided by the permanent magnet is denoted by $B_-$ 26 and $B_+$ 27, and within this field range, the unipolar tunneling magnetoresistance switch is capable of opening or closing. For example, when a magnetic field B is applied parallel to a TMR magnetic sensor's sensitive direction and magnetic field exceeds the operating threshold point B OP, the unipolar switch turns off, and the output goes low. When a magnetic field B is applied parallel to a TMR magnetic sensor's sensitive direction and magnetic field passes the release point B below the threshold B RP, the unipolar switch turns on, and the output goes high. The operating and release point thresholds B OP and B RP have the same magnetic field polarity, but the release point BOP may be 0 G. The difference between the operate and release points is denoted as the hysteresis of the switch B h.

Example 5

Figure 6:
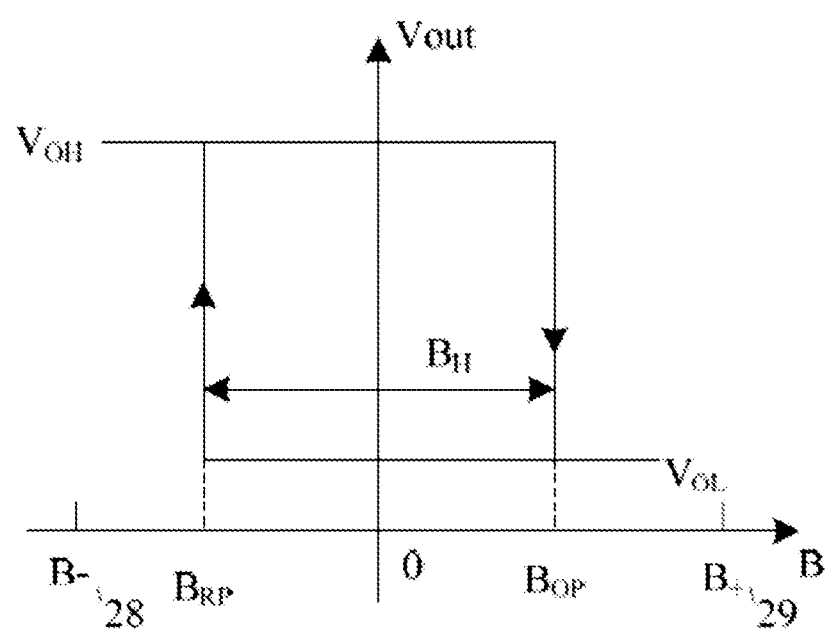
FIG. 6 illustrates the bipolar switching operation of a tunneling magnetoresistance switch.

In this embodiment, the tunneling magnetoresistance switching unit 3 utilizes bipolar tunneling magnetoresistance switches. The magnetization of the permanent magnet on the outside of the nonmagnetic tube has a magnetization that is aligned parallel the sensitive direction of the bipolar tunneling magnetoresistance switches and perpendicular to the axial direction of the nonmagnetic tube. A bipolar tunneling magnetoresistance switch output signal is shown schematically in FIG. 6. In this figure, the magnetic field provided by the permanent magnet is denoted by $B_-$ 28 and $B_+$ 29, and within this field range, the unipolar tunneling magnetoresistance switch is capable of opening or closing. When a magnetic field B is applied parallel to a TMR magnetic sensor's sensitive direction and magnetic field exceeds the operating threshold point B OP, the bipolar switch turns off, and the output goes low. When a magnetic field B is applied parallel to a TMR magnetic sensor's sensitive direction and magnetic field passes the release point B below the threshold B RP, the bipolar switch turns on, and the output goes high.

The operating and release point thresholds B OP and B RP have opposite magnetic field polarity, and neither may be 0 G. The difference between the operate and release points is denoted as the hysteresis of the switch B H.

Example 6

Figure 7:
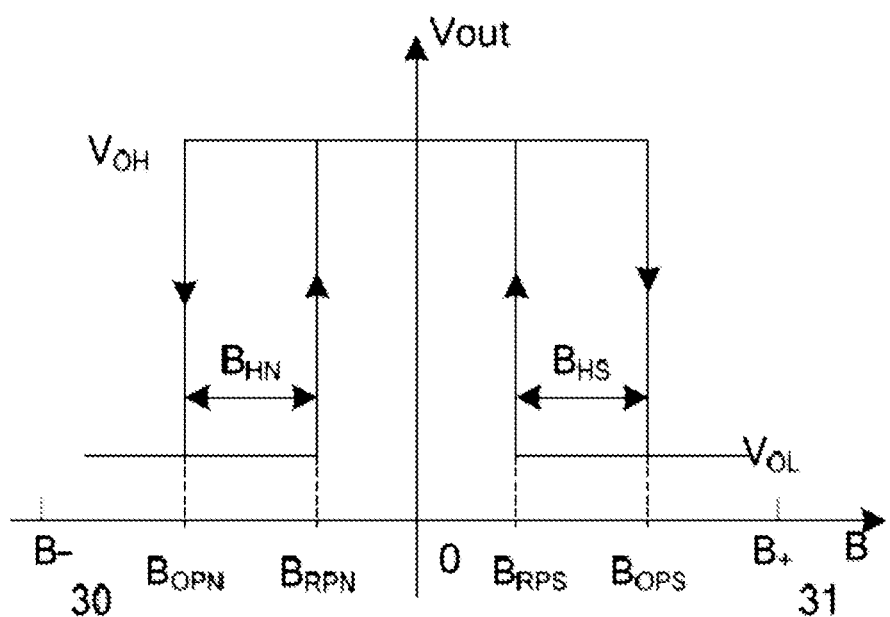
FIG. 7 illustrates the omnipolar switching operation of a tunneling magnetoresistance switch.

In this embodiment, the tunneling magnetoresistance switching unit 3 utilizes omnipolar tunneling magnetoresistance switches. The magnetization of the permanent magnet on the outside of the nonmagnetic tube has a magnetization that is aligned parallel the sensitive direction of the bipolar tunneling magnetoresistance switches and parallel or perpendicular to the axial direction of the nonmagnetic tube. An omnipolar tunneling magnetoresistance switch output signal is shown schematically in FIG. 7. In this figure, the magnetic field provided by the permanent magnet is denoted by $B_-$ 30 and $B_+$ 31, and within this field range, the omnipolar tunneling magnetoresistance switch is capable of opening or closing. When a magnetic field B is applied parallel to a TMR magnetic sensor's sensitive direction and magnetic field exceeds the operating threshold point B OPS or B OPN the omnipolar switch turns off, and the output goes low. When a magnetic field B is applied parallel to a TMR magnetic sensor's sensitive direction and magnetic field passes the release point B below the threshold B RPS or B RPN the omnipolar switch turns on, and the output goes high. The difference between the operating and release point thresholds B OPS and B RPS is denoted as the hysteresis of the switch B HS, and the difference between the operating and release point thresholds B OPN and B RPN is denoted as the hysteresis of the switch B HN, and neither release point B RPS or B RPN may be 0 G.

The above described preferred embodiments of the present invention do not limit the possible variations of the invention, and those skilled in the art can make various modifications and changes that do not exceed the scope of the invention. Any modification made within the spirit and principle of the present invention by replacement with equivalent or improved features falls within the scope of the present invention.

The invention claimed is:

1. A digital liquid-level sensor for placement within a container for fluid to measure a level of the fluid and output a digital signal representing the level of the fluid, the digital liquid-level sensor having low current consumption during operation, the digital liquid-level sensor comprising a structure configured to be placed in fluid within the fluid in the container, the structure comprising:
    a nonmagnetic tube configured to be rigidly fixed in place in the container for the fluid, and one or more printed circuit boards sealed within the nonmagnetic tube;
    a float configured to float in the fluid near and outside of the nonmagnetic tube, such that the float is able to move through a plurality of positions along the side of the nonmagnetic tube in the axial direction as the level of the fluid changes;
    a permanent magnet fixed to the float, wherein the permanent magnet is configured to produce a magnetic field within the nonmagnetic tube;
    a plurality of tunneling magnetoresistance switches on the one or more printed circuit boards sealed within the nonmagnetic tube, wherein the permanent magnet and each of the one or more of the tunneling magnetoresistance switches are configured to cooperate to trigger one or more of the tunneling magnetoresistance switches near the permanent magnet, wherein each of the plurality of tunneling magnetoresistance switches is characterized by a low current consumption of less than 10 microamps thereby providing the digital liquid-level sensor with the low current consumption during operation;
    an encoding unit including at least one encoder on the one or more printed circuit boards sealed within the nonmagnetic tube, wherein the at least one encoder is operably connected to the plurality of tunneling magnetoresistance switches to generate a unique digital signal for each of the plurality of positions of the float;
    a power supply terminal on the one or more printed circuit boards sealed within the nonmagnetic tube for connection to a power supply line; and a data bus operably connected to an output of the at least one encoder and configured for use in outputting the unique digital signal representing the level of the fluid from the digital liquid-level sensor, wherein the digital liquid-level sensor is configured to be placed in the container, measure the level of the fluid by sensing a position of the permanent magnet fixed to the float using the plurality of tunneling magnetoresistance switches and output digital signals from the plurality of tunneling magnetoresistance switches, using the encoding unit to convert the digital signals output from the plurality of tunneling magnetoresistance switches into the unique digital signal on the data bus for each of the plurality of positions of the float.

2. The digital liquid-level sensor of claim 1, wherein the nonmagnetic tube has an axial length of 10 to 12000 mm and an outer diameter of 12 to 40 mm.

3. The digital liquid-level sensor of claim 1, wherein the float has a width of 10 to 200 mm and a height of 10 to 200 mm.

4. The digital liquid-level sensor of claim 1, wherein the magnetization direction of the permanent magnets is parallel to the axial direction of the nonmagnetic tube, the tunneling magnetoresistance switches are omnipolar or unipolar tunneling magnetoresistance switches, and the sensitive direction of the tunneling magnetoresistance switches is parallel to the axial direction of the nonmagnetic tube.

5. The digital liquid-level sensor of claim 1, wherein the magnetization direction of the permanent magnets is perpendicular to the axial direction of the nonmagnetic tube, the tunneling magnetoresistance switches are omnipolar, bipolar, or unipolar tunneling magnetoresistance switches, and the sensitive direction of the tunneling magnetoresistance switches is perpendicular to the axial direction of the nonmagnetic tube.

6. The digital liquid-level sensor of claim 1, wherein the float is coaxially disposed around the nonmagnetic tube, and the inner diameter of the float is greater than the outer diameter of the nonmagnetic tube.

7. The digital liquid-level sensor of claim 1, wherein the tunneling magnetoresistance switches are disposed at equal intervals on the printed circuit board.

8. The digital liquid-level sensor of claim 1, wherein the encoders are priority encoders.

9. The digital liquid-level sensor of claim 8, wherein the encoders have $2^N$ input terminals and N output terminals, where N is an integer.

10. The digital liquid-level sensor of claim 8, wherein the position of the float is represented using a set of numbers $0, 1, \ldots, 2^N-1$, where N is an integer, and the numbers are linearly proportional to the height of the liquid's surface.

11. The digital liquid-level sensor of claim 1, wherein the encoder is implemented as an ASIC or programmable logic device including an FPGA or a CPLD in order to minimize the number of components on the printed circuit board.

12. The digital liquid-level sensor of claim 1, wherein the number of tunneling magnetoresistance switches is $2^N$, the data bus is at least N bits wide, and N is an integer.

13. The digital liquid-level sensor of claim 1, wherein an output terminal of each of the tunneling magnetoresistance switches is connected to an input terminal of the encoders.

14. The digital liquid-level sensor of claim 1, wherein the encoders have an output interface electrically connected to the corresponding terminals in the data bus.

15. The digital liquid-level sensor of claim 1, wherein the printed circuit board is a flexible printed circuit board.

16. The digital liquid-level sensor of claim 1, wherein the encoders and the tunneling magnetoresistance switches are small rigid printed circuit boards that are interconnected by a flexible printed circuit board.

17. A digital liquid-level sensor with low current-consumption for placement within a container for fluid, comprising:

a nonmagnetic tube configured to be rigidly fixed in place in the fluid, and one or more printed circuit boards sealed within the nonmagnetic tube;

a float configured to move through a plurality of positions along a side of the nonmagnetic tube;

a permanent magnet fixed to the float;

the nonmagnetic tube containing a magnetic switching unit on the one or more printed circuit boards sealed within the nonmagnetic tube, the magnetic switching unit comprising tunneling magnetoresistance switches, each of the tunneling magnetoresistance switches configured to consume less than 10 µA and to be closed or opened by a magnetic field produced by the permanent magnet, and containing an encoding unit on the one or more printed circuit boards sealed within the nonmagnetic tube, including at least one priority encoder operably connected to each of the tunneling magnetoresistance switches and configured output from the digital liquid-level sensor a unique digital signal representing one of the plurality of positions; and a power supply terminal on the one or more printed circuit boards sealed within the nonmagnetic tube for connection to a power supply line, and an internal voltage regulator to provide temperature compensation, wherein the tunneling magnetoresistance switches that each consume less than 10 µA enable the digital liquid-level sensor to have the low-current consumption through the power supply line during operation, and wherein the digital liquid-level sensor is configured to be placed in the container, measure the level of the fluid by sensing a position of the permanent magnet fixed to the float using the plurality of tunneling magnetoresistance switches and output digital signals from the plurality of tunneling magnetoresistance switches, using the encoding unit to convert the digital signals output from the tunneling magnetoresistance switches into the unique digital signal on the data bus for each of the plurality of positions of the float.

18. The digital liquid-level sensor of claim 17, wherein the number of tunneling magnetoresistance switches is $2^N$, and the tunneling magnetoresistance switches are disposed at known positions along the axis of the nonmagnetic tube.

* * * * *